US005719973A

United States Patent [19]
Monroe et al.

[11] Patent Number: 5,719,973
[45] Date of Patent: Feb. 17, 1998

[54] OPTICAL WAVEGUIDES AND COMPONENTS WITH INTEGRATED GRIN LENS

[75] Inventors: Douglas W. Monroe, Bucks County, Pa.; Muhammed A. Shahid, Mercer County, N.J.

[73] Assignee: Lucent Technologies Inc., Murray Hill, N.J.

[21] Appl. No.: 688,324

[22] Filed: Jul. 30, 1996

[51] Int. Cl.⁶ .................................................. G02B 6/32
[52] U.S. Cl. ............................. 385/34; 385/33; 385/123
[58] Field of Search ................................. 385/34, 32, 33, 385/35, 36, 37, 38, 123, 124, 125, 126, 127, 128; 359/652, 653, 654

[56] References Cited

U.S. PATENT DOCUMENTS

| | | | |
|---|---|---|---|
| 5,093,877 | 3/1992 | Aita et al. | 385/34 |
| 5,163,107 | 11/1992 | Gars | 385/74 |
| 5,446,816 | 8/1995 | Shiraishi et al. | 385/33 |

OTHER PUBLICATIONS

Ion Implantation, H. Ryssel and I. Ruge, Chapter 8.2, "Ion Implantation Into Optical Materials" no mont, no year.
"Ion Implantation In Optical Materials", P.D. Townsend, Inst. Phys. Conf. Ser. No. 28, 1976 no month.
"Efficient Coupling From Semiconductor Lasers Into Single-Mode Fibers With Tapered Hemispherical Ends", H. Kuwahara, M. Sasaki, and n. Tokoyo, Applied Optics, vol. 19, Aug. 1, 1980.
"Chemically Etched Concial Microlenses For Coupling Single-Mode Lasers Into Single-Mode Fibers", G. Eisenstein and D. Vitello, Applied Optics, vol. 21, No. 19, Oct. 1, 1982.
"Design of Gradient-Index Lens Systems For Laser Beam Reshaping", C. Wang, and D. Shealy, Applied Optics, vol. 32, No. 25, Sep. 1, 1993.

Primary Examiner—Phan T. H. Palmer

[57] ABSTRACT

An optical device such as an optical fiber waveguide having at least one light transceiving end suitable for transmitting or receiving light, the optical device comprising a core suitable for allowing transmission therethrough of light, a cladding layer surrounding the core and having an index of refraction less than that of the core, and an embedded lens integrally located at the light transceiving end. The embedded lens is preferably a gradient refractive index (GRIN) lens having a refractive index that varies along a radial axis of the light transceiving end of the device and along a longitudinal axis of the light transceiving end of the device. The embedded GRIN lens is comprised of a plurality of dopant regions; the dopant regions comprise regions extending a predetermined distance along the longitudinal axis and having a predetermined diameter. Each dopant region is formed by applying to the light transceiving end of the optical device a mask having an opening with a diameter equivalent to a predetermined diameter, such that an area having the predetermined diameter is exposed, and then bombarding the exposed area with ions of a predetermined energy level. A plurality of like optical devices may be processed in accordance with the present invention in a batch mode by forming an array of devices and utilizing masks appropriate to process each device in parallel.

15 Claims, 4 Drawing Sheets

OPTICAL WAVEGUIDES AND COMPONENTS WITH INTEGRATED GRIN LENS

FIELD OF THE INVENTION

This invention relates to the coupling of optical components and devices such as optical waveguides or fibers, and in particular to the fabrication of a gradient index (GRIN) lens integral to the optical component in order to achieve high coupling efficiency of the optical components.

BACKGROUND OF THE INVENTION

It is highly desirable to provide efficient optical coupling between components and devices in an optical communications system. In particular, optical components such as laser diodes, optical switches, modulators, wavelength selecting devices and the like are optically coupled together by optical fibers. The coupling or interconnection of such devices to a waveguide is complicated by a mismatch-between the numerical apertures of the optical device and the waveguide.

In addition, the extremely small diameter of the optical fibers used for optical communications, which is on the order of 125 μm in outer diameter with a typical core diameter of 8 μm, makes mechanical alignment of the fiber core with other optical components difficult. Since a desirable quality of an optical data transmission system is to transmit light energy with minimal loss and distortion, attempts have been made in the prior art to provide a means for aligning optical components without suffering the deleterious effects described herein.

In particular, it has been proposed in the prior art to solve optical component coupling alignment problems by the use of a discrete micro or GRIN lens. For example, U.S. Pat. No. 5,163,107 discloses the use of a fiber optic coupler/connector with a GRIN lens positioned in a bore through the coupler axially aligned with the optic fiber. The GRIN lens conditions the light, for example collimates or expands the light signals entering and exiting the optic fiber. Typically, the light signals are coupled between two fiber optic cables, each fitted with the coupler described in the '107 patent, such that the coupler end plate faces are positioned adjacent to each other with common axial alignment. This type of combination has the disadvantage of requiring separate piece parts which need to be handled, critically aligned, and reliably attached. In addition, because the separate GRIN lenses comprise reflective surfaces, additional performance degrading reflections are introduced into the optical system.

Another solution proposed in the prior art is the use of tapered hemispherical fiber lenses. These lenses are made on an individual basis and are subject to difficulties in radius control. They also suffer from limited numerical aperture and high spherical aberration. Laser machined lenses—another proposed solution—are also made individually in a time consuming process.

Also proposed has been the use of a lens etched on the tip of the glass fiber. U.S. Pat. No. 5,200,024 discloses a wet chemical etching technique for forming a lensed optical fiber. Although this is a desirable technique since it provides for batch processing, thus keeping manufacturing costs relatively lower, the numerical aperture is limited by the fiber dopant profile and the physical shape of the lens. In addition, etched lenses are subject to etching related defects, and the etched lens may be damaged more easily from handling. Finally, the uniform deposition of anti-reflection (AR) coatings is made more difficult by the surface topology of tapered, machined, etched or otherwise shaped lenses.

Thus, there is a need for an optical coupler that is simple to implement and that provides an improved alignment for joining optical devices.

SUMMARY OF THE INVENTION

The present invention is an optical component such as an optical fiber waveguide having at least one light transceiving end suitable for transmitting or receiving light, the optical component comprising: core suitable for allowing transmission therethrough of light, a cladding layer surrounding the core and having an index of refraction less than that of the core, and an embedded lens integrally located at the light transceiving end. The embedded lens is preferably a gradient refractive index (GRIN) lens having a refractive index that varies along a radial axis of the light transceiving end of the device and/or along a longitudinal axis of the light transceiving end of the device. The embedded GRIN lens is comprised of at least one dopant region having a refractive index that varies along a radial axis and/or along a longitudinal axis of the light transceiving end of the device.

In one aspect of the invention, the embedded GRIN lens is comprised of a plurality of dopant regions wherein each dopant region has a predetermined diameter and extends a predetermined distance along the longitudinal axis.

In accordance with another aspect of the invention, the dopant regions are configured such that the dopant region with the shortest longitudinal distance has the largest diameter and the dopant region with the longest longitudinal distance has the smallest diameter.

In accordance with yet another aspect of the invention, the embedded GRIN lens is comprised of multiple dopant regions which comprises first dopant region extending a first distance along the longitudinal axis and having a first diameter; a second dopant region extending a second distance along the longitudinal axis and having a second diameter, the second distance being less than the first distance and the second diameter being greater than the first diameter; and subsequent dopant regions extending a predetermined distance along the longitudinal axis and having a predetermined diameter, such that each subsequent distance being less than the previous distance and each subsequent diameter being greater than the previous diameter.

The first dopant region is formed by applying to the light transceiving end of the optical device a mask having an opening with a diameter equivalent to the first diameter, such that an area having the first diameter is exposed, and then bombarding the exposed area with ions of a first energy level. The second dopant region is formed by applying to the light transceiving end of the optical device a mask having an opening with a diameter equivalent to the second diameter, such that an area having the second diameter is exposed, and then bombarding the exposed area with ions of a second energy level, the second energy level being less than the first energy level. The subsequent dopant regions are formed by applying to the light transceiving end of the optical device a mask having an opening with a diameter equivalent to a predetermined diameter, such that an area having the diameter is exposed, and then bombarding the exposed area with ions of a subsequent energy level, the subsequent energy level being less than the prior energy level. The type of the ion, the ion dose level, or duration of implantation may be controlled in order to vary the ion concentration. For example, a relatively longer bombardment time will result in a relatively higher ion concentration, which will result in a relatively higher index of refraction.

BRIEF DESCRIPTION OF THE DRAWINGS

The subject matter regarded as the invention is particularly pointed out and distinctly claimed in the concluding portion of the specification. The invention, however, both as to the organization and method of operation, together with features, objects, and advantages thereof may best be understood by reference to the following detailed description when read with the accompanying drawings in which:

DETAILED DESCRIPTION OF THE DRAWINGS

Figure 1:
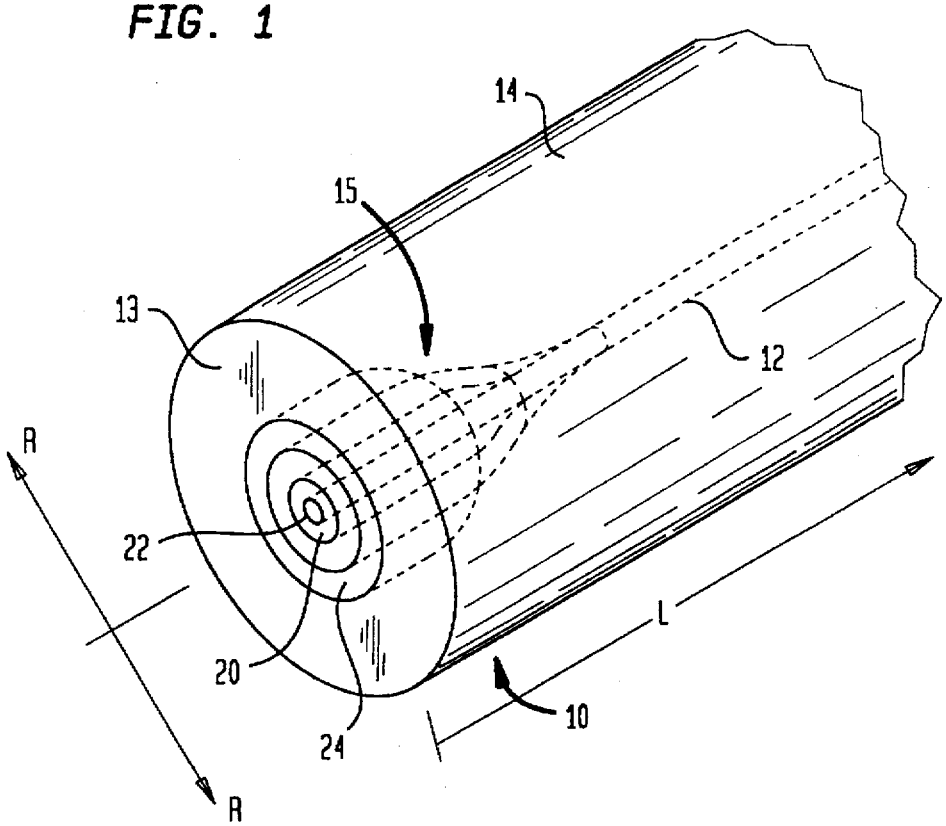
FIG. 1 is a perspective view of an optical fiber with an embedded GRIN lens in accordance with one embodiment of the present invention.
Figure 2:
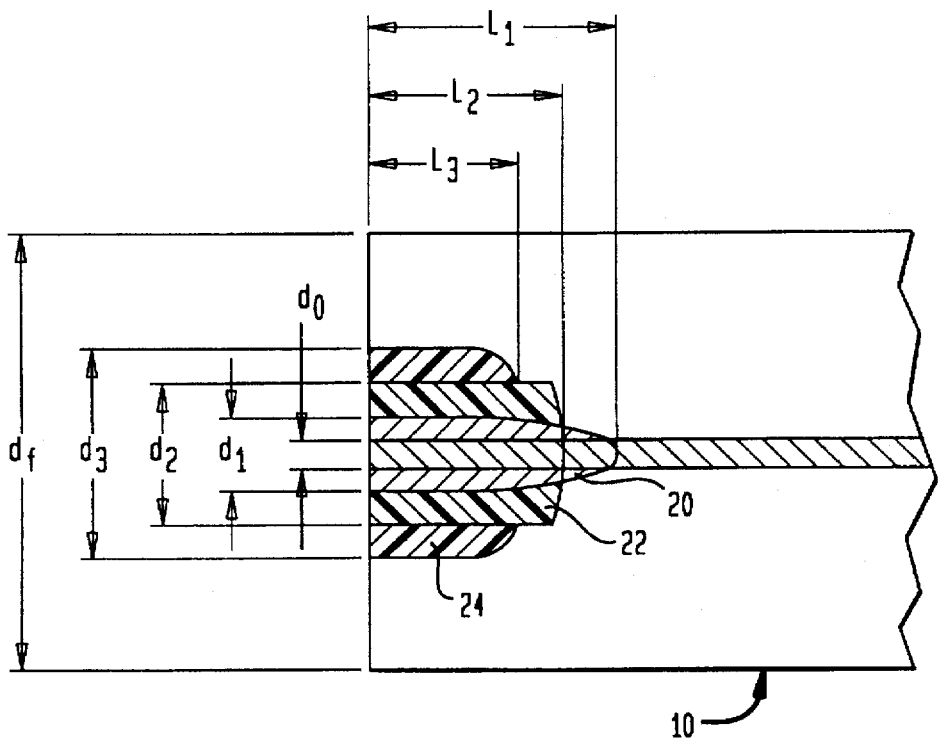
FIG. 2 is a side cross-section view of the fiber of FIG. 1.

A fiber optic waveguide 10 is illustrated in FIG. 1 and comprises a core 12 surrounded by cladding 14 in a manner well known in the prior art. Fiber optic waveguide 10 has a fiber tip or light transceiving end 13 capable of transmitting and/or receiving light. Fiber optic waveguide 10 is adapted by way of the present invention to provide efficient coupling with other optical components to which it is coupled by embedding, during a lens manufacturing process, an integral gradient index (GRIN) lens 15 in the fiber tip 13 such that optical waves incident thereon are conditioned, for example collimated or focused for efficient transmission through the core of the fiber. It is noted that the present invention is not limited in scope to a fiber optic waveguide and other optic waveguides may be implemented in accordance to the principles disclosed herein.

GRIN lens 15 is embedded into the fiber during a manufacturing process that allows a batch process for providing lensing to the fiber heretofore unrealized by the prior art. This is accomplished by the use of selective local regional doping via masked ion bombardment of fiber tip 13 so as to provide a controlled ion concentration and distribution throughout the region of fiber 10 that forms lens 15. The selective distribution of impurity atoms by way of this ion bombardment provides fiber 10 with the beneficial qualities of a GRIN lens in order to overcome the deficiencies of the prior art.

GRIN lens 15 embedded in fiber 10 of the present invention implements a gradient refractive index along a longitudinal axis L as well as along a radial axis R of the fiber. For example, the refractive index changes, in particular decreases, along the radial axis of the fiber from a predetermined maxima at the center of the core 12 to a predetermined minima at a certain radius of the fiber. Furthermore, the refractive index may change, in particular decrease, from a predetermined maxima at the fiber tip 13, to a predetermined minima at a certain point along the length of the fiber. However, the invention is not limited in scope in that respect, and a desired profile of refractive index may be achieved in accordance with the principles of the present invention.

Furthermore, because of a masking process, explained in detail hereinafter, the refractive index also varies radially along the surface of fiber tip 13. The resulting effect of both of these gradient fields may for example result in a substantially funnel shaped refractive index gradient which functions as a lens that brings the light incident to the fiber to a central focal point, thus providing a highly focused beam with minimal distortion and without the requirement that the coupled optical components be precisely aligned as in the prior art. When used in conjunction with a light transmitting device such as a laser diode, GRIN lens 15 may act to provide the complementary function of forming a parallel beam of light from a concentrated point.

In accordance with one embodiment of the invention and by way of example, GRIN lens 15 of optical fiber 10 is made from three independently formed substantially concentric refractive index gradient zones or dopant regions of impurity atoms, each of which is formed by a separate ion bombardment step in the fabrication process, and the entirety of which forms the integral GRIN lens. However, it is noted that the invention is not limited in scope in this respect, and a GRIN lens formed of one or many dopant regions may be provided in accordance with the principles discussed herein.

A first region 20 has the smallest diameter d1 and extends the furthest length L1 into the fiber 10; a second region 22 has a larger diameter d2 and a smaller length L2 into the fiber, and a third region 24 has the largest diameter d3 and the shortest length L3 into the fiber.

Figure 3A:
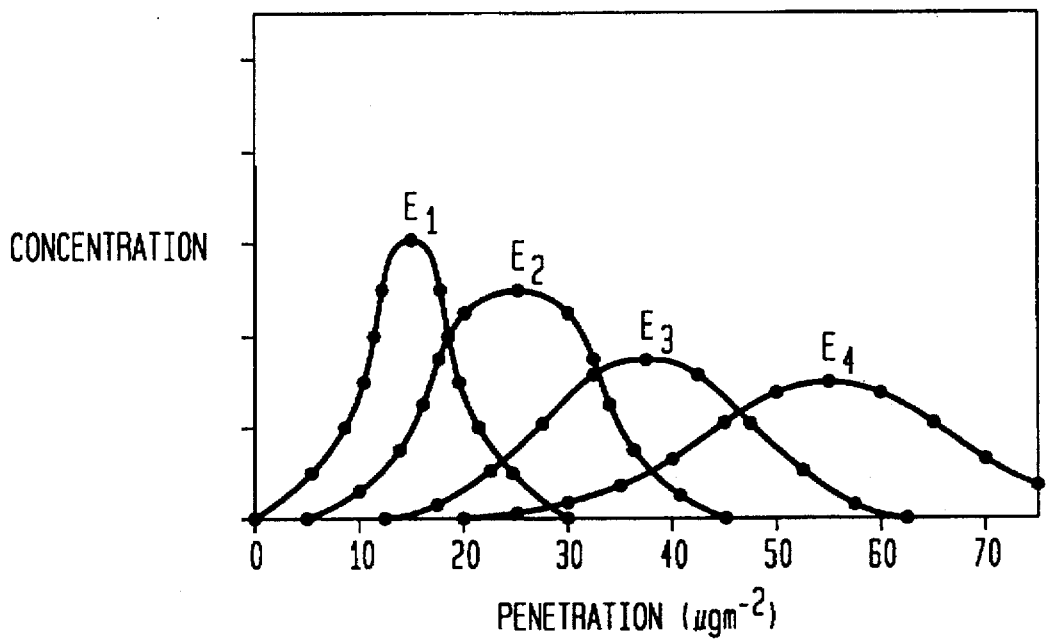
FIG. 3(a) is an exemplary plot illustrating ion distribution profiles based on ion implantation energy.

FIG. 3a illustrates a typical profile of implanted ion concentration as a function of penetration along longitudinal distance L into the fiber, for various implantation energies. The ion concentration is defined as the number of ions per unit volume. The depth distribution of implanted ions has a skewed Gaussian shape. For the same implantation duration, and same incident flux of ions, or dose, higher implant energies result in deeper penetration with a smaller ion concentration. Since the refractive index is directly proportional to the concentration of ions, the net effect is that a deeper but less dense concentration of ions will result from higher implant energies. For this illustration, ion energy $E_1$ represents the smallest ion implantation energy and ion energy $E_4$ represents the largest ion implantation energy. Ion implantation profiles have been well studied and described in *Ion Implantation Of Semiconductors* by g. Carter and W. A. Grant (Edward Arnold 1976).

Figure 3B:
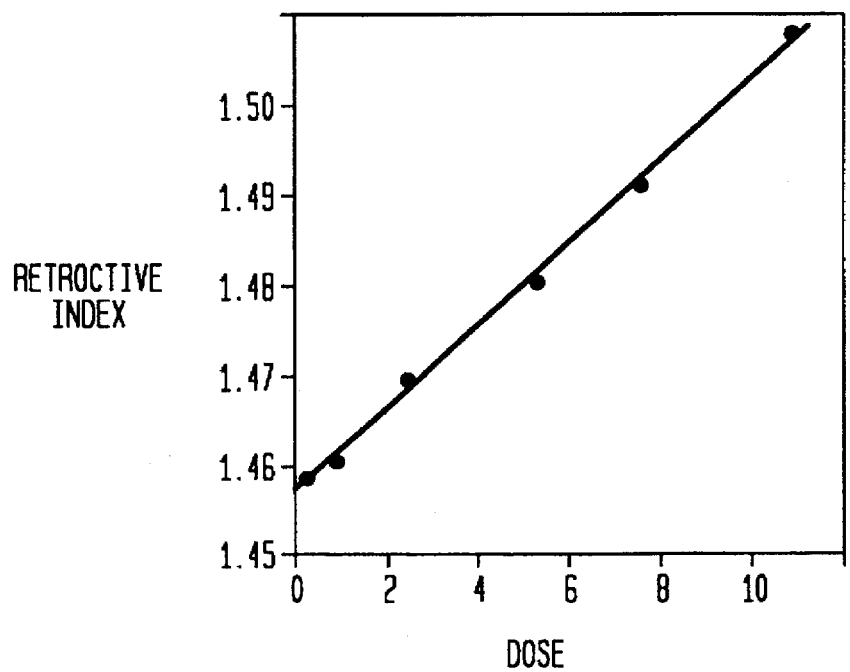
FIG. 3(b) is an exemplary plot illustrating the change in refractive index as a function of ion dosage.

FIG. 3b illustrates the change in the refractive index as a function of the ion dosage. The dosage in this illustration is on the order of $10^{14}$ cm$^{-2}$. Dosage is defined as the number of incident ions per unit area per unit time. Thus, based on the profiles illustrated in FIGS. 3a and 3b it is possible to control the refractive index profile along the longitudinal and radial axis of the fiber region wherein GRIN lens 15 is formed.

An additional factor to be used in forming the embedded GRIN lens 15 is the ion dose level, or duration of implantation. The ion concentration at a certain point away from the surface of the fiber is proportional to the implantation duration, which may thus be manipulated to form the GRIN lens. Thus, the ion dose level may be increased in order to obtain a relatively higher ion concentration and, accordingly, a relatively higher index of refraction. Longer implantation time will also increase the concentration of dopants, hence increase the refractive index.

The processing steps of masking and ion bombardment may be performed at virtually any step in the lens processing, but suffice it to say that the GRIN lens fabrication steps are performed in the final phases in the preferred embodiment. Each region is formed via ion bombardment during the fiber fabrication process by suitable masking techniques, wherein a mask layer is applied to the face of the fiber, the mask leaving exposed only the area with which the region will be bombarded with ions. By changing the strength of the bombardment field, the shape and size of the masks, the duration of bombardment, and the type of ion with which the bombardment is accomplished, the shape, density and depth of the regions can be tailored to form the integral GRIN lens. Furthermore, a gradient index along the surface of the fiber is advantageously formed.

Figure 4A:
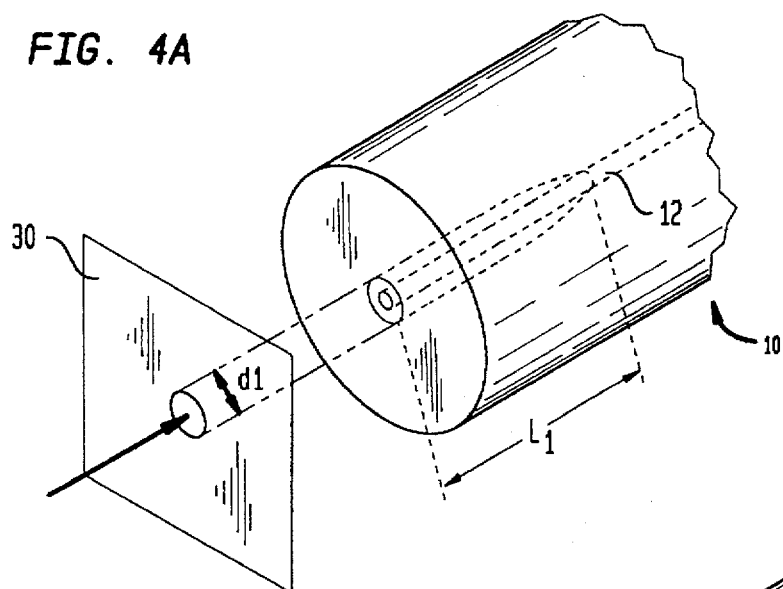
FIGS. 4(a) through 4(c) are illustrations of the masking steps used to fabricate the embedded GRIN lens in accordance with one embodiment of the present invention.
Figure 4B:
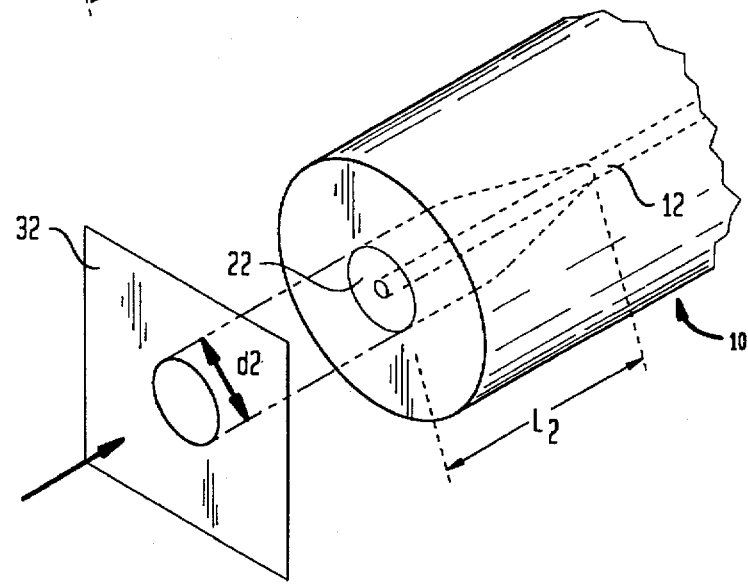
Figure 4C:
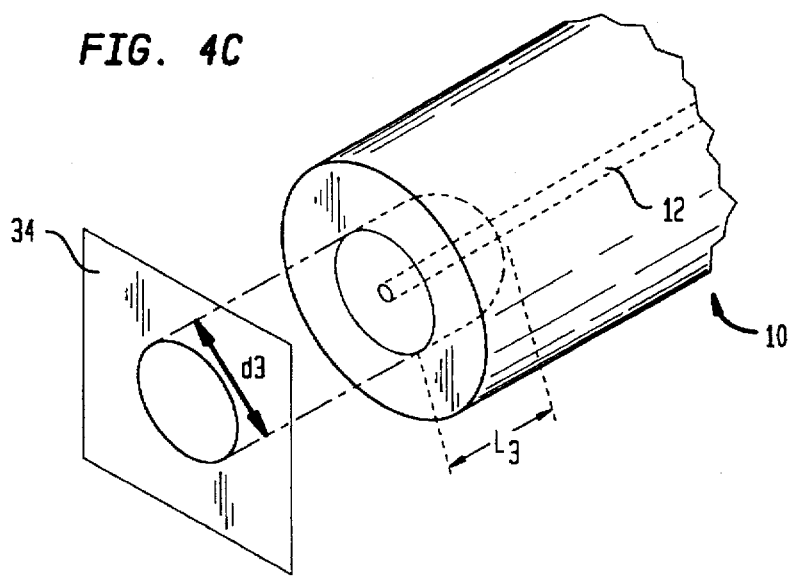

FIGS. 4(a) through 4(c) illustrate an example of a process to form a GRIN lens 15 in a predetermined region of fiber optic 10. It is noted, however, that the invention is not limited in scope to this example and other types of GRIN lens may be formed in accordance with the principles discussed herein. Thus, the first region 20 is formed with a first mask layer 30, which provides an exposure of diameter d1 and which is substantially concentric with the core of the fiber 10. Ions are caused to be bombarded on the fiber tip for a duration of time $t_1$ and at a density or concentration $c_1$.

Similarly, the second region 22 is formed with a second mask layer 32, which provides an exposure of diameter $d_2$ and which is substantially concentric with the core of the fiber 10. Diameter $d_2$ is larger than diameter $d_1$. Ions are caused to be bombarded on the fiber tip for a duration of time $t_2$, which is shorter than $t_1$ and at a density or concentration $c_2$.

Further, the third region 24 is formed with a third mask layer 34, which provides an exposure of diameter $d_3$ and which is substantially concentric with the core of the fiber 10. Diameter $d_3$ is larger than diameter $d_2$ and diameter $d_1$. Ions are caused to be bombarded on the fiber tip for a duration of time $t_3$, which is shorter than $t_2$, and at a density or concentration $c_3$.

As a result of each masking and bombardment step described herein, an embedded GRIN lens 15 is formed within and integrated with fiber tip 13 which has a refractive index gradient which varies in both the radial and longitudinal directions. The overall radial variation is due to the use of the different mask diameters, which causes differing levels of ion concentration as predetermined by the process parameters. The longitudinal variation is due to the use of different energy levels for each mask stage, which provides varying dosage depths as exemplified by FIG. 3.

An alternative processing methodology employs the use of thin film technology instead of the physical masks as described above. By using thin film masks it is possible to control the ion concentration depth such that, for example, the concentration peak lies on the surface of the fiber rather along the longitudinal axis along the fiber. Referring back to FIG. 3a, it is noted that by using a thin film mask, it is possible to control the depth within which a desired ion concentration is formed. For example, if it is desired to move the entire profile generated by ion implantation at energy $E_2$, by a predetermined distance, so that the profile is closer to the surface of the fiber, a thin film mask may be deposited on the fiber end surface before the ion bombardment. Thus, the entire profile is formed at a different distance, than what it would have been formed without the thin film mask.

The depth of ion concentration obtained by the present invention is predetermined as a function of the focal length desired for the GRIN lens, which may vary according to the particular application of the lens.

In the preferred embodiment, glass is used to form the optical fiber waveguide in a manner well known in the art. When the present invention is used to form integral GRIN lenses in conjunction with other optical devices, materials such as indium phosphide, lithium niobate, and gallium arsenide may be used as known in the prior art. It is noted that since such materials have a crystalline structure, if ions are bombarded at a certain critical angle to the fiber surface, the desired profiles may not be achieved and ions will travel a distance much farther than expected due to what is known in the art as atomic channeling. Since the devices made from such materials use single crystalline substrate the effect due to this atomic channeling is to be avoided as is known in the art. For example, ions are preferably bombarded at angles that suppress channeling.

Although the present invention has been described with reference to doping the fiber core, it is to be understood that the cladding may also be similarly doped if desired by a particular application. In addition, lenses of varying shape and dimension may be formed as desired by varying the parameters described herein (bombardment time, ion energy, ion type) as well as varying the number and shapes of the mask levels used to form the lens.

Advantages attendant the present invention are readily apparent when contrasted with the problems of the prior art. In particular, since the GRIN lens is effectively buried within the optical fiber, the likelihood of damage to the lens by handling is practically eliminated, and anti-reflective coating or angle polishing is made much easier.

Figure 5:
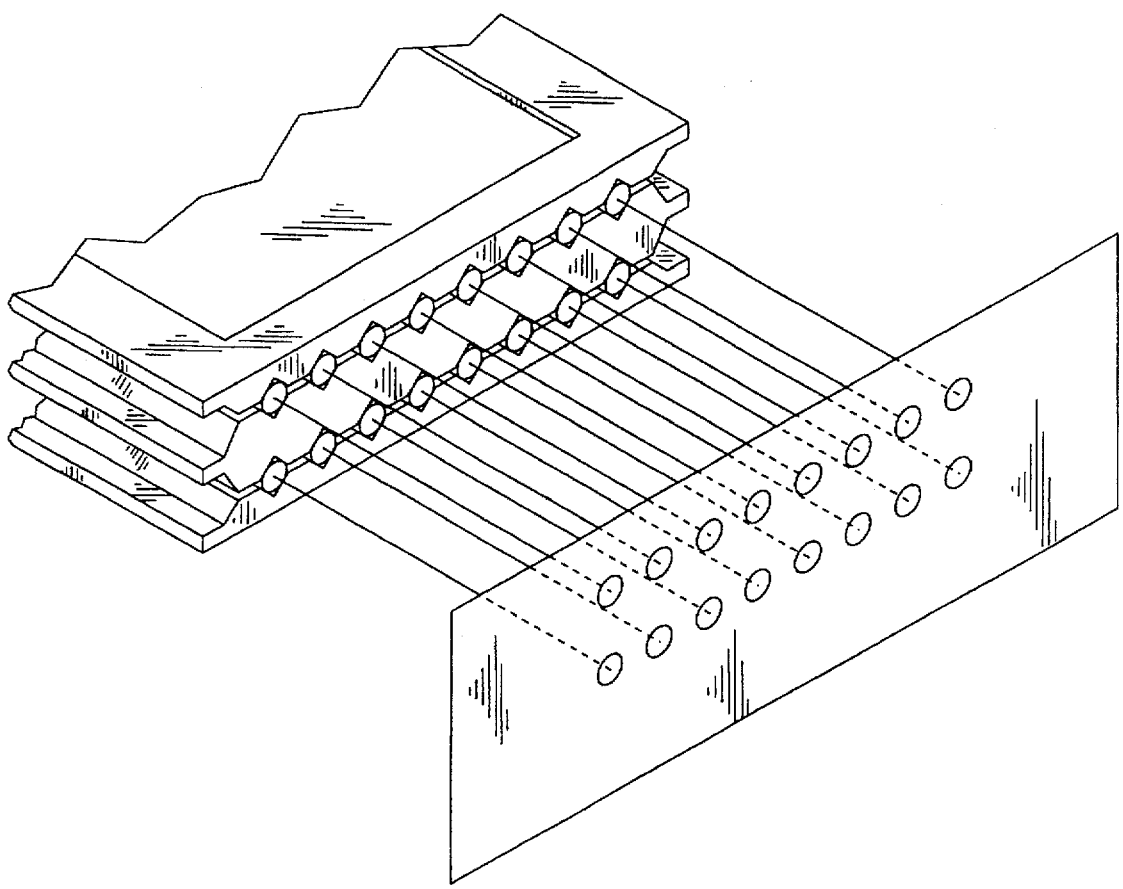
FIG. 5 is a perspective illustration of an array of fibers being processed in accordance with an embodiment of the present invention.

The lensing process may be performed in a batch mode, by for example placing a number of fibers in a V-block fiber assembly as shown in FIG. 5 and masking apertures aligned with each core of each fiber as described above. Batch mode fiber processing is advantageous since it allows a large number of fibers to be processed at once, wherein each fiber is provided with the same dosage level, duration, etc. By providing a series of masks adapted to process a larger number of fibers, processing efficiency and consistency are easily achieved.

We claim:

1. An optical device having at least one light transceiving end suitable for transmitting or receiving light, comprising:
   a core suitable for allowing transmission therethrough of light;
   a cladding layer surrounding the core and having an index of refraction less than that of the core; and
   an embedded gradient refractive index (GRIN) lens formed integrally within optical device in a given region along longitudinal axis of said optical device.

2. The optical device of claim 1 in which the embedded GRIN lens is comprised of at least one dopant region having a refractive index that varies along said at least one axis of the light transceiving end of the device.

3. The optical device of claim 2 wherein said axis is a longitudinal axis.

4. The optical device of claim 3 in which the number of dopant regions is at least two.

5. The optical device of claim 4 wherein the dopant regions are configured such that the dopant region with the shortest longitudinal distance has the largest diameter and the dopant region with the longest longitudinal distance has the smallest diameter.

6. The optical device of claim 5 wherein said axis is a radial axis.

7. The optical device of claim 1 in which the embedded GRIN lens has refractive index that varies along a longitudinal axis of the light transceiving end of the device.

8. The optical device of claim 7 in which the embedded GRIN lens has a refractive index that varies along a radial axis of the light transceiving end of the device.

9. The optical device of claim 1 wherein the embedded GRIN lens is comprised of multiple dopant regions which comprises first dopant region extending a first distance along the longitudinal axis and having a first diameter; a second dopant region extending a second distance along the longitudinal axis and having a second diameter, the second distance being less than the first distance and the second diameter being greater than the first diameter; and subsequent dopant regions extending a predetermined distance along the longitudinal axis and having a predetermined diameter, such that each subsequent distance being less than the previous distance and each subsequent diameter being greater than the previous diameter.

10. The optical device of claim 9 in which:

the first dopant region is formed by applying to the light transceiving end of the optical device a mask having an opening with a diameter equivalent to the first diameter, such that an area having the first diameter is exposed, and then bombarding the exposed area with ions of a first energy level;

the second dopant region is formed by applying to the light transceiving end of the optical device a mask having an opening with a diameter equivalent to the second diameter, such that an area having the second diameter is exposed, and then bombarding the exposed area with ions of a second energy level; and each subsequent dopant region is formed by applying to the light transceiving end of the optical device a mask having an opening with a diameter equivalent to a predetermined diameter, such that an area having said predetermined diameter is exposed, and then bombarding the exposed area with ions of a predetermined energy level.

11. A method for fabricating an optical device having at least one light transceiving end suitable for transmitting or receiving light, comprising the steps of:

providing a core suitable for allowing transmission therethrough of light;

providing a cladding layer around the core, the cladding layer having an index of refraction less than that of the cladding layer; and forming an embedded gradient refractive index (GRIN) lens integrally within said optical device in a given region along longitudinal axis of said optical device.

12. The method of claim 11 in which said step of forming the embedded GRIN lens includes the step of varying the refractive index along said longitudinal axis of the light transceiving end of the device.

13. The method of claim 12 in which said step of forming the embedded GRIN lens includes the step of varying the refractive index along a radial axis of the light transceiving end of the device.

14. The method of claim 13 in which said step of forming the embedded GRIN lens comprises the steps of:

forming a first dopant region extending a first distance along the longitudinal axis and having a first diameter;

forming a second dopant region extending a second distance along the longitudinal axis and having a second diameter; and forming subsequent dopant regions each region extending a predetermined distance along the longitudinal axis and having a predetermined diameter.

15. The method of claim 14 in which:

each region is formed by applying to the light transceiving end of the optical device a mask having an opening with a diameter equivalent to a predetermined diameter, such that an area having said predetermined diameter is exposed, and then bombarding the exposed area with ions of a predetermined energy level.

* * * * *